(12) United States Patent
Klar et al.

(10) Patent No.: US 6,713,917 B2
(45) Date of Patent: Mar. 30, 2004

(54) DRIVE DEVICE

(75) Inventors: Josef Klar, Lochgau (DE); Johannes Helmich, Wertheim (DE); Friedrich Kaiser, Bietigheim-Bissingen (DE); Ronald Frey, Bonnigheim (DE); Werner Baeskow, Hessigheim (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 0 days.

(21) Appl. No.: 10/049,193

(22) PCT Filed: Jun. 6, 2001

(86) PCT No.: PCT/EP01/06398

§ 371 (c)(1),
(2), (4) Date: Jun. 17, 2002

(87) PCT Pub. No.: WO01/94812

PCT Pub. Date: Dec. 13, 2001

(65) Prior Publication Data

US 2002/0163267 A1 Nov. 7, 2002

(30) Foreign Application Priority Data

Jun. 6, 2000 (DE) .......................................... 100 27 920

(51) Int. Cl.$^7$ ................................................ H02K 7/08
(52) U.S. Cl. ......................................... 310/90; 310/89
(58) Field of Search ............................. 310/90, 89, 91, 310/98; 384/372, 296

(56) References Cited

U.S. PATENT DOCUMENTS

| | | | |
|---|---|---|---|
| 2,703,737 A | | 3/1955 | Turner |
| 4,399,380 A | * | 8/1983 | Hirano .......................... 310/62 |
| 4,420,703 A | * | 12/1983 | Adam et al. ........... 310/154.36 |
| 5,095,236 A | * | 3/1992 | Walsh .......................... 310/89 |
| 5,644,180 A | * | 7/1997 | Buchanan, Jr. ............... 310/90 |
| 6,044,723 A | | 4/2000 | Eda et al. |
| 6,229,233 B1 | * | 5/2001 | Torii et al. ................. 310/75 R |
| 6,288,464 B1 | * | 9/2001 | Torii et al. ..................... 310/78 |

FOREIGN PATENT DOCUMENTS

WO    WO 98/26963    6/1998

* cited by examiner

Primary Examiner—Thanh Lam
(74) Attorney, Agent, or Firm—J. Gordon Lewis

(57) ABSTRACT

A drive device includes an electric drive motor, a housing, at least one shaft which is driven by the drive motor, and a compensating member for compensating the axial clearance of the shaft. A spring ring disk, which can be expanded radially counter to an elastic force and has two stopping surfaces radially extending towards each other on the axis of the shaft in the form of a wedge, is arranged on the shaft as the compensating member. The shaft has a ring-shaped projection which matches one of stopping surfaces and the housing has an annular collar which matches the other stopping surface. The spring ring disc is pre-tensed and arranged in between the projection and the annular collar.

14 Claims, 2 Drawing Sheets

DRIVE DEVICE

BACKGROUND

The invention relates to a drive device with an electric drive motor, with a housing, with at least one shaft driven by the drive motor and with compensating means to compensate for the axial play of the shaft.

In the following a shaft driven by a drive motor is understood to mean an output shaft driven by the drive motor through a gear, specifically through a worm gear, as well as an armature driven directly by the drive motor.

Drive devices of this type find an application particularly in the automotive industry as servo motors for seat adjustments, steering column adjustments, window regulators, sliding sunroofs or similar, and as drive devices for windshield wiper systems. The drive devices normally have a worm gear attached to the drive motor, which advantageously has small dimensions, can transmit high levels of power and is self-braking.

Specifically because of the tapered flanks of the worm shafts and the worm gear in a worm drive of this type, an axial force acts on the armature of the drive motor during operation of the drive device, as well on the output shaft of the worm drive. The direction of the axial force depends on the direction of rotation of the armature. With a change in direction of the drive motor or a change in external load the direction of the axial force on the armature as well as on the output shaft is reversed because the worm gear is loaded in the opposite direction. Because of manufacturing tolerances in the individual components of the drive mechanism and because of operating wear in the area of the axial mounting of the shafts, relatively large, undesirable play can develop in the various shafts. As a consequence of axial play of this type, abrupt starting motions and irritating noises result when the drive motor reverses direction.

In addition, it is difficult to achieve precise positioning when starting or reversing a window that is being opened, for example, or a sliding sunroof.

Furthermore, noticeable relative motions can result if the servo motor is employed as a seat back adjuster, for example, and the driver perceives the axial play as relative motion even when the motor is not running.

This phenomenon is additionally known in the case of steering column adjustments.

From DE-OS 23 12 395 a drive device of the type described above is known which has a small wedge-shaped or vee-shaped block at the open end of the shaft, operating axially on the shaft as a compensating means to compensate for the play in a shaft. The small block is impelled by means of a coil spring. The disadvantage of a device of this type is that corresponding protrusions, which are expensive to manufacture and take up additional installation space, are required on the housing to locate the small block and the accompanying coil spring.

The object of the present invention is therefore to design and develop a drive device of the type named at the beginning so that it is constructed as simply as possible and compensates reliably for the axial play in the shaft.

SUMMARY

This object is accomplished by locating a tapered thrust bearing which can be expanded radially against a spring force on the shaft as a compensating means, with two contact surfaces tapering radially inward toward the shaft, by the shaft having an annular projection which corresponds to one of the contact surfaces and by the housing having an annular collar which corresponds to the other contact surface, where the expanded tapered thrust bearing is positioned between the projection and the annular collar under pre-load.

What is accomplished under the invention is that because of the expanded tapered thrust bearing, which is under pre-load and which bears against the housing, the shaft is pressed against the annular collar with an axial force by means of the tapered contact surfaces. The axial force compensates for the axial play. Since the expanded tapered thrust bearing is positioned between the housing and the annular projection on the shaft, almost no additional installation space is required in order to locate the compensating means. Advantageously under the invention, the number of individual components in the compensating means is kept down to only the expanded tapered thrust bearing, since the projection can be executed in one piece with the shaft and the annular collar in one piece with the housing. A substantial advantage of the invention is that because of the pre-loaded expanded tapered thrust bearing, axial play is compensated for when the drive motor is running as well as when it is stationary.

During assembly of the drive device, the tapered thrust bearing positioned between the annular collar and the projection on the shaft is expanded, whereby the axial portion of the pre-load force from the expanded tapered thrust bearing acting on the shaft through the two tapering contact surfaces impinges on the shaft with an axial force that compensates for the axial play.

Advantageously, the contact surfaces run symmetrically at an angle of about 15° to the plane formed by the tapered thrust bearing, where the surfaces on the annular collar and the projection corresponding to the contact surfaces have a matching taper. This achieves an even application of the pre-load force from the tapered thrust bearing against the shaft on the one hand and against the housing on the other hand. This counteracts any tendency on the part of the tapered thrust bearing to become wedged between the annular collar and the projection on the shaft.

In order to ensure that the tapered thrust bearing is sufficiently expanded, it is advantageously configured to be slotted. In addition, provision can be made for the tapered thrust bearing to have slot-like recesses in the area of its inner circumference which permit additional elastic expansion and contraction of the tapered thrust bearing.

In an advantageous aspect of the invention, the tapered thrust bearing has a slotted spring clamping wire. By this means, a higher spring constant in particular is achieved, and the tapered thrust bearing can be placed under a higher pre-load.

Advantageously, the spring clamping wire is located in a groove running around the circumference of the tapered thrust bearing. This allows the tapered thrust bearing to be preassembled jointly with the spring clamping wire, which results in substantial simplification of final assembly of the drive device.

In order to prevent slipping or twisting of the spring clamping wire, advantageous provision can be made for the groove to have a transverse rib in the area facing away from the slot on the tapered thrust bearing to locate the slot in the spring clamping wire.

In another further development of the invention, the shaft has an annular groove-like recess in which the tapered thrust bearing is retained by positive engagement. This has the advantage that the shaft can be preassembled together with the tapered thrust bearing and loosening is prevented because the tapered thrust bearing is positively retained on the shaft.

In the case of an especially preferred aspect of the invention, the tapered thrust bearing is made of plastic, specifically from a polyamide, where the plastic has an anti-friction coating specifically of graphite, molybdenum disulfide or similar materials, or, respectively, contains graphite, molybdenum disulfide or similar materials. The effect of this is that the two contact surfaces on the tapered thrust bearing have good friction characteristics with respect to the projection on the shaft on the one hand and the annular collar on the gear housing on the other.

Advantageous provision can be made under the invention for the projection to be located on a gear wheel, specifically a worm wheel on the shaft. This dispenses with an annular projection which has be specially located on the shaft.

In an additional development of the invention, the projection is made from a plastic, specifically from polymethylene oxide. A plastic of this kind exhibits advantageous friction properties specifically with respect to a tapered thrust bearing of polyamide. It is also conceivable that the annular groove-like recess is configured as a plastic part in one piece with the projection, which eliminates machining of the shaft.

In another advantageous aspect of the invention, the annular collar is located on a cover of the housing, specifically a zinc die-cast cover. With the location of the cover on the housing, the annular collar is pressed against the contact surface of the tapered thrust bearing facing the annular collar when the drive device is assembled, whereby the tapered thrust bearing is expanded and is positioned between the projection and the annular collar under pre-load.

DETAILED DESCRIPTION OF THE DRAWING

Additional advantageous aspects and details of the invention can be found in the following description, in which the invention is described in greater detail and explained using the embodiment shown in the drawing in which.

DETAILED DESCRIPTION

Figure 1:
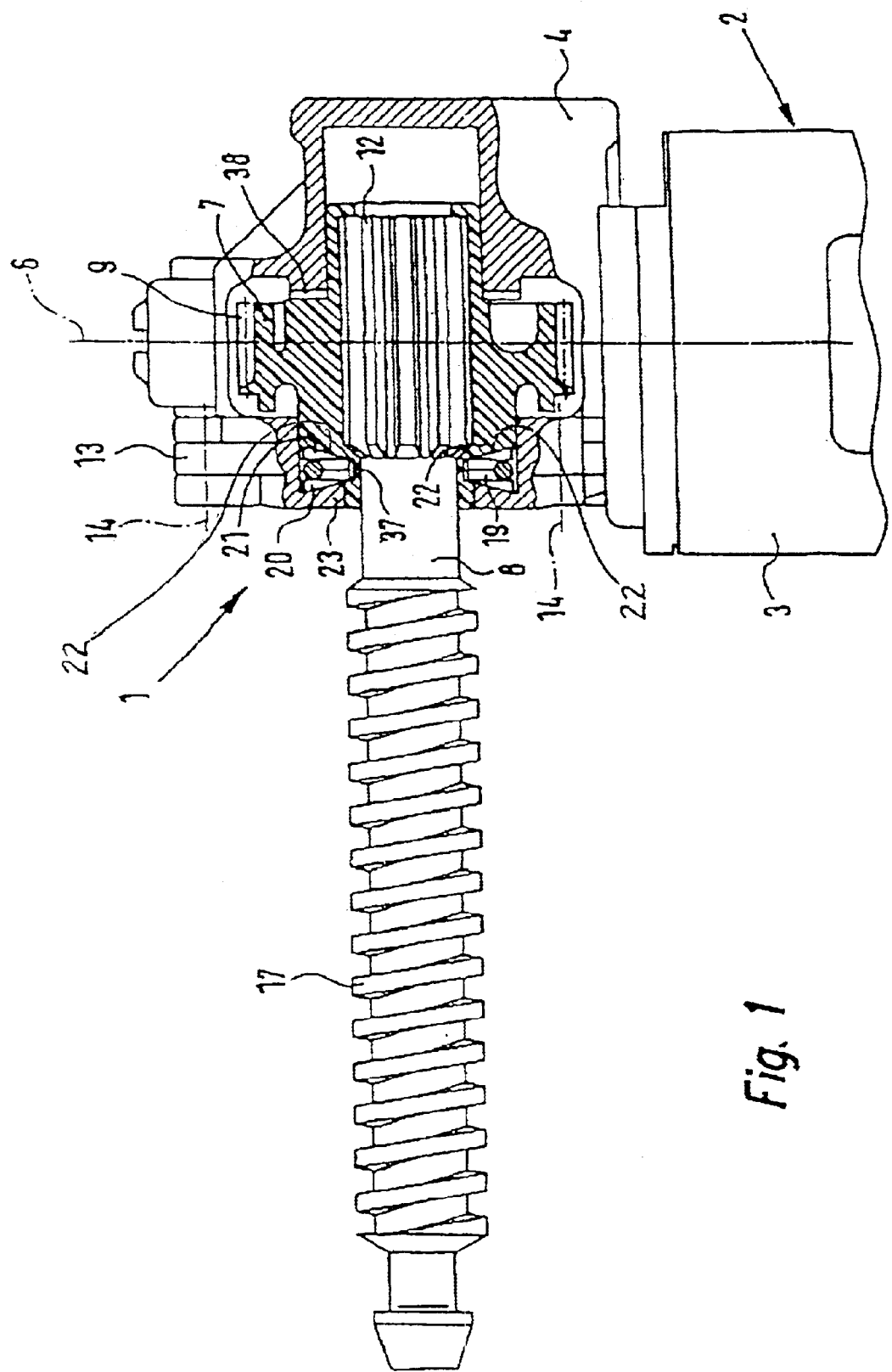
FIG. 1 is a partial sectional of a drive device of the invention in a side elevation.

In FIG. 1, a drive device 1 is shown with an electric drive motor 2 and a housing. The housing of the drive device is divided into two sections, firstly, into a motor housing 3 and a gear housing 4 which houses a worm gear. The drive motor 2 has an armature and also a worm located at the open end of the armature. The armature of the drive motor 2 runs along the axis 6. In FIG. 1, the armature with the accompanying worm cannot be seen because it is concealed by a worm gear 7 driven by the worm and an output shaft 8 connected to the worm gear 7 such that it cannot turn freely.

The worm gear 7 has bevel gears 9 on its outer circumference, which mesh with the worm which cannot be seen. The worm gear 7 is molded as a plastic part onto the output shaft 8, which has straight-cut splines 12 in this area to create a positive connection between the worm gear 7 and the output shaft 8.

The gear housing 4 has a housing cover 13 which is attached to the gear housing 4 by means of threaded fasteners 14. In the area of the output shaft 8 facing away from the worm gear 7, there is a trapezoidal thread 17 on which a sliding block, which is not shown, can be located, and which drives the component to be actuated by the drive device 1 by means of a mechanical link. The drive device 1 shown in FIG. 1 is specifically intended to drive a seat adjuster of a seat for motor vehicles.

A tapered thrust bearing 19 which can be expanded radially against a spring force, with two contact surfaces 20 and 21 tapering radially toward the shaft axis, is located on the output shaft 8. The shaft 8 has an annular projection 22 corresponding to the contact surface 21. The other contact surface 20 on the tapered thrust bearing 19 corresponds to an annular collar 23 present on the housing 4 or on the housing cover 13, respectively. Because the cover 13 is attached to the housing 4, the tapered thrust bearing 19 is positioned under pre-load in an expanded state between the projection 22 and the annular collar 23. Because of the pre-load on the tapered thrust bearing 19, the spring force acts radially through the contact surfaces 20, 21 on the output shaft 8, whereby an axial force is exerted on the latter, compensating for axial play.

Figure 2:
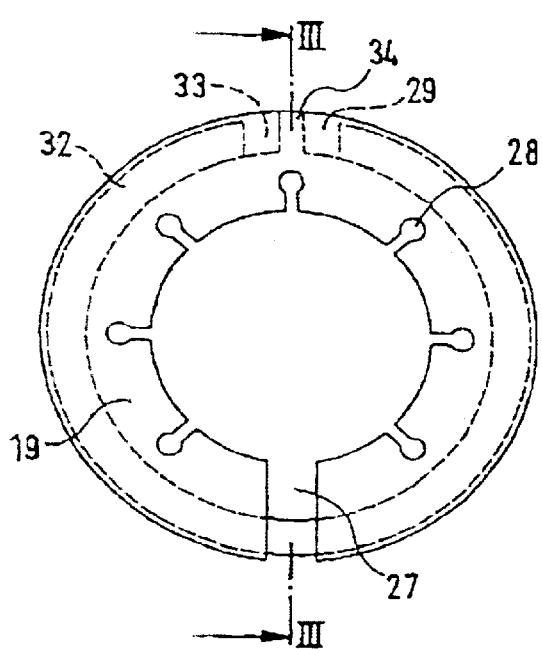
FIG. 2 is a tapered thrust bearing in a front view.
Figure 3:
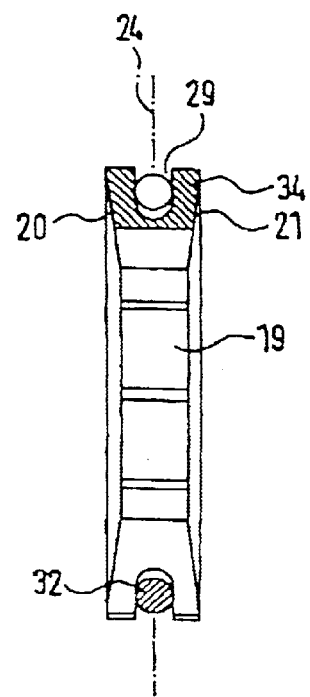
FIG. 3 is the tapered thrust bearing according to FIG. 2 in cross section.

As can be seen clearly from FIG. 3, the contact surfaces 20 and 21 run symmetrically at an angle of about 15° to the plane 24 formed by the tapered thrust bearing. It can be seen from FIG. 2 that the tapered thrust bearing 19 is slotted and has a slot 27. In addition, the tapered thrust bearing 19 has slot-like recesses in the area of its inner circumference. The tapered thrust bearing 19 additionally has a spring clamping wire 32 in a groove running around the circumference of the tapered thrust bearing, and this ring also has a slot 33. A transverse rib 34 to locate the slot is provided in the groove 29 in the area opposite the slot 27 in the tapered thrust bearing 19. This prevents the spring clamping wire 32 from slipping in the groove 29.

As FIG. 1 clearly shows, the worm gear 7 has an annular groove-shaped recess 37 in which the tapered thrust bearing 19 is retained by positive engagement. It is also conceivable that the annular groove-shaped recess 37 is not present on the worm gear 7, but directly on the shaft 8. Pre-assembly of the tapered thrust bearing 19 to the worm gear 7 or the shaft 8 respectively is rendered easier by the positive engagement. A thrust washer 38 is present on the end face of the worm gear 7 facing away from the tapered thrust bearing between the housing 4 and the worm gear 7.

The thrust washer acts as an axial bearing between the gear housing 4 and the worm gear 7. With a suitable choice of material for the worm gear 7 and the gear housing 4, this type of thrust washer can be eliminated.

All the features presented in the description, the subsequent claims and the drawing can be essential to the invention both individually as well as in any given combination.

What is claimed is:

1. A drive device comprising:
   an electric drive motor;
   a housings;
   at least one shaft driven by the drive motor, the shaft having a compensating means to compensate for axial play of the shaft;
   a tapered thrust bearing having two contact surfaces tapering radially toward the shaft axis, the tapered thrust bearing positioned on the shafts for compensating axial play, and operable for radially expanding against a spring force, the shaft having an annular projection for engaging one of the contact surfaces and the housing having an annular collar for corresponding to the other contact surface, the tapered thrust bearing positioned under pre-load between the annular projection and the annular collar.

2. The drive device in accordance with claim 1, wherein the contact surfaces run symmetrically at an angle of about 15° to a plane formed by the tapered thrust bearing, where the surfaces of the annular collar and of the projection which correspond to the contact surfaces have a matching taper.

3. The drive device in accordance with claim 1, wherein the tapered thrust bearing is slotted.

4. The drive device in accordance with claim 1, wherein the tapered thrust bearing has slot-like recesses in the area of its inner circumference.

5. The drive device in accordance with claim 1, wherein the tapered thrust bearing has a slotted spring clamping wire.

6. The drive device in accordance with claim 5, wherein the spring clamping wire is located in a groove running around a circumference of the tapered thrust bearing.

7. The drive device in accordance with claim 6, wherein the groove has a transverse rib in an area facing away from a slot in the tapered thrust bearing to locate a slot in the spring clamping wire.

8. The drive device in accordance with claim 1, wherein the shaft has an annular recess in which the tapered thrust bearing is retained by positive engagement.

9. The drive device in accordance with claim 1, wherein the tapered thrust bearing is made of plastic, and the plastic has one of an anti-friction coating of one of graphite and molybdenum disulfide, and contains one of graphite, and molybdenum disulfide.

10. The drive device in accordance with claim 1, wherein the projection is located on a gear wheel.

11. The drive device in accordance with claim 1, wherein the projection is made of a plastic.

12. The drive device in accordance with claim 1, wherein the annular collar is located on a housing cover of the housing.

13. The drive device of claim 11 wherein the plastic is polyethylene oxide.

14. The drive device of claim 12 wherein the housing cover is a zinc die-cast cover.

* * * * *